Figure 1:
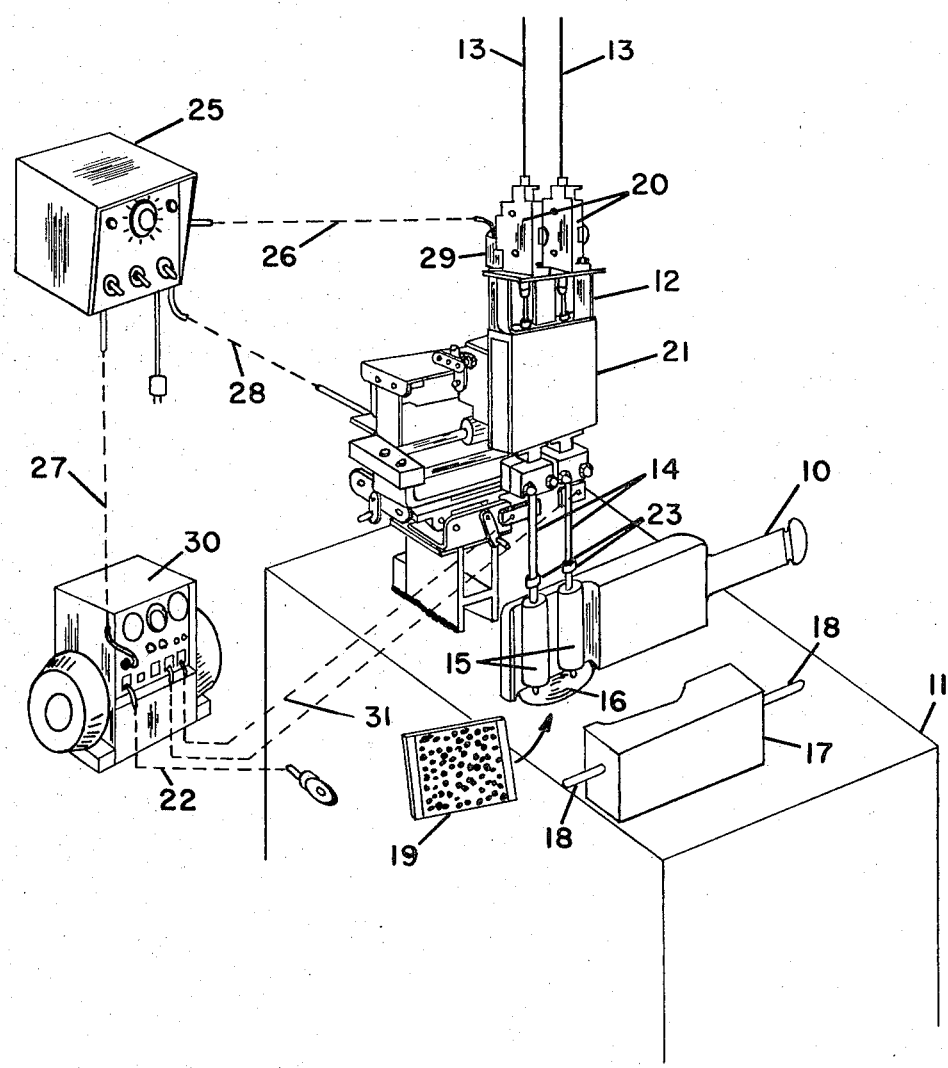

United States Patent
Bierwith

[11] 3,766,354
[45] Oct. 16, 1973

[54] METHOD OF MANUFACTURING LAMINATED TEETH FOR BUCKETWHEEL EXCAVATOR USING ELECTROSLAG COATING

[75] Inventor: Stanton F. Bierwith, Berkeley, Calif.

[73] Assignee: Great Canadian Oil Sands, Limited, Toronto, Canada

[22] Filed: Mar. 29, 1972

[21] Appl. No.: 239,073

[52] U.S. Cl............ 219/77, 219/73, 219/76, 219/126
[51] Int. Cl............................................ B23k 9/04
[58] Field of Search............... 219/146, 145, 137, 219/126, 77, 76, 73; 173/409, 410, 411; 76/DIG. 11, 1; 37/142

[56] References Cited
UNITED STATES PATENTS

| | | | |
|---|---|---|---|
| 3,101,274 | 8/1963 | Beyerstedt et al. | 219/145 |
| 2,021,040 | 11/1935 | Zublin | 219/77 |
| 1,635,217 | 7/1922 | Kirchman | 219/76 |
| 1,977,128 | 10/1934 | Hawkins | 219/76 |
| 2,043,142 | 6/1936 | Zublin | 219/77 |

Primary Examiner—J. V. Truhe
Assistant Examiner—George A. Montanye
Attorney—George L. Church et al.

[57] ABSTRACT

Electroslag welding techniques for hardfacing a base metal workpiece to provide a tool with a bilaminar surface containing a matrix of abrasion resistant alloy containing hard carbide particles.

8 Claims, 9 Drawing Figures

PATENTED OCT 16 1973

3,766,354

SHEET 1 OF 4

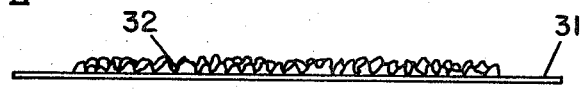
FIG. II
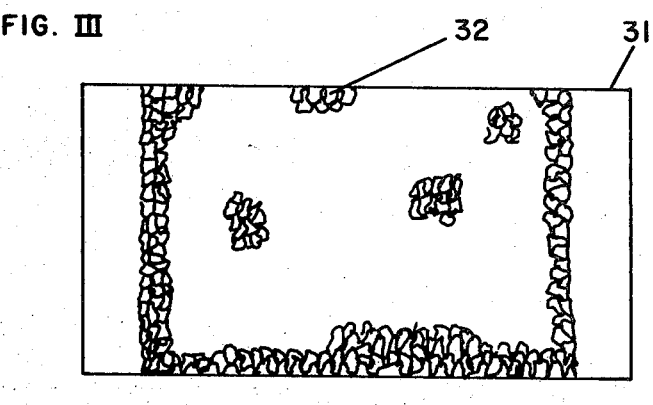
FIG. III
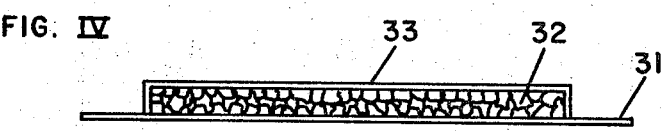
FIG. IV
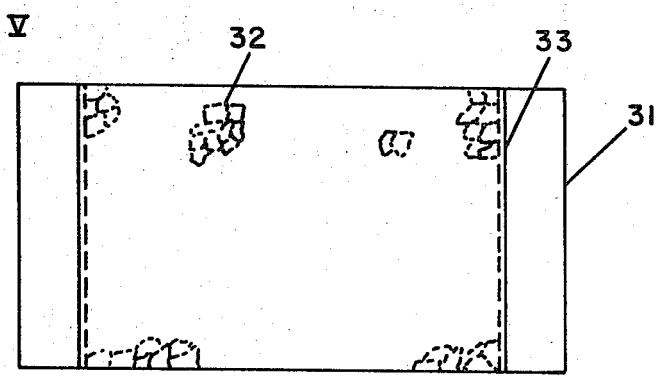
FIG. V

FIG. VI
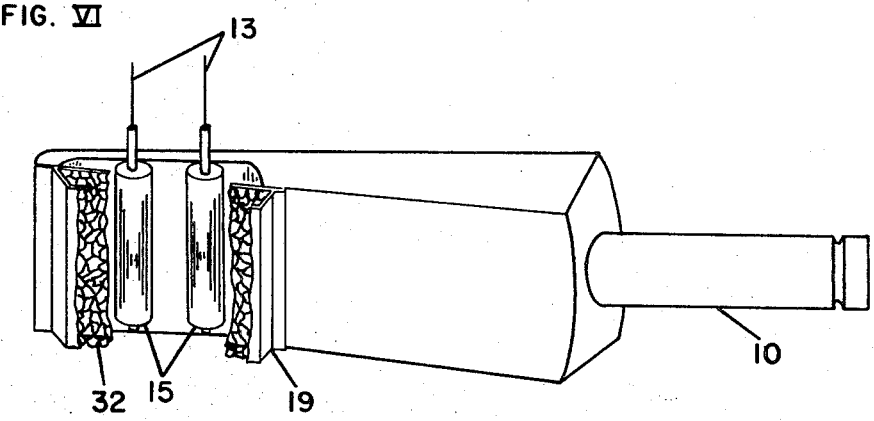
FIG. VII
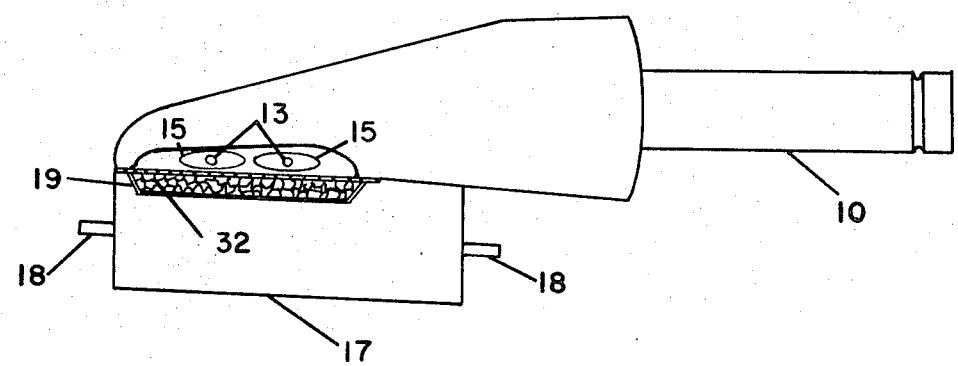

FIG. VIII
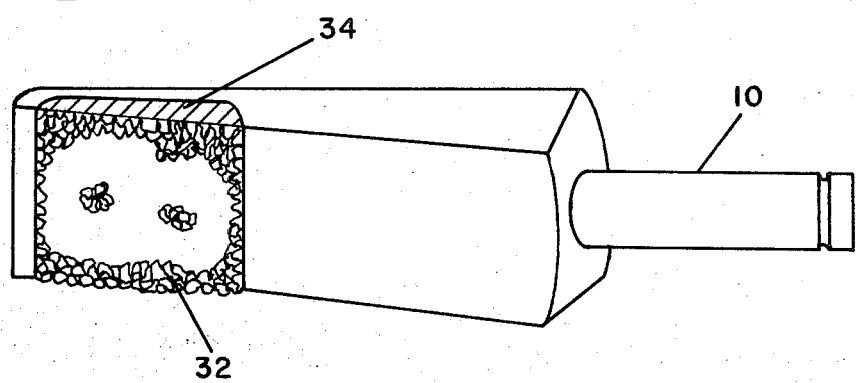
FIG. IX
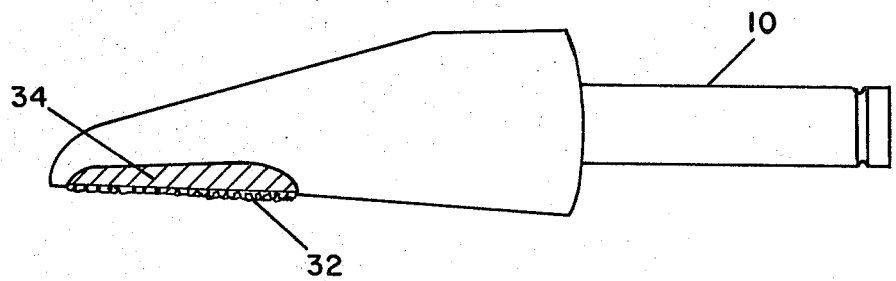

METHOD OF MANUFACTURING LAMINATED TEETH FOR BUCKETWHEEL EXCAVATOR USING ELECTROSLAG COATING

BACKGROUND OF THE INVENTION

The present invention relates to a method of hardfacing workpieces utilizing metal alloys conferring special properties such as high wear, heat and corrosion resistance to a metal workpiece. More particularly, the present invention relates to methods of manufacturing hardfaced tools particularly suitable for use with bucketwheel excavators in mining highly abrasive ores.

In the past, many methods have been disclosed for providing workpieces comprising a base metal with a hard work surface. For example, U. S. Pat. No. 3,023,130 issued Feb. 27, 1962 to R. D. Wasserman et al. discloses a method of depositing a hard surface on a base metal which comprises fusing chromium carbide or other hard metal carbides to the surface of the workpiece using a specific hard surfacing electrode in an electric arc welding procedure. By this procedure, a matrix containing the alloy of carbides is deposited on the surface of the workpiece.

Another example of a method known for hardfacing a workpiece is disclosed in U. S. Pat. No. 2,280,223 wherein hard particles such as refractory metallic carbides are held within a matrix which maintains them firmly to the base metal. The matrix metal consists of hard alloying agents such as cobalt, molybdenum and vanadium and the like.

U. S. Pat. No. 2,755,369 issued July 17, 1956 to H. I. Shrubsall discloses a procedure of hardfacing a metal workpiece which generally comprises disposing welding electrodes along the surface to be hardfaced. These electrodes are immersed in a granular bed of the metal alloy which is to be fused on the surface of the workpiece. An electric arc is initiated between the base metal workpiece and the electrodes by passing an electric current therethrough. The subsequent heat generated by the electric arc while melting the electrode also fuses the granular metal particles to the surface of the base metal.

The metal overlays provided on the workpiece by the methods disclosed in these patents have been reasonably successful for the uses for which they were particularly intended.

Procedures for hardfacing metal surfaces are also disclosed by B. E. Patent in the text "Electroslag Welding" published by the American Welding Society, Inc., New York, N.Y., Reinhold Publishing Corporation, 1962. This text discloses a procedure for hardfacing metal surfaces utilizing electroslag welding techniques to provide a metal alloy clad on the surface of the workpiece. The metal alloy is fused with the base metal and thereby provides a total unit having an improved hardfaced surface resistant to wear and abrasion.

The methods disclosed in the prior art as well as the tools provided thereby unfortunately do not provide a hardfaced metal workpiece having hardness and tensile strength which is particularly suitable for use over a wide temperature range including extreme cold of −40° to −60° F. Further, a workpiece or hardfaced tool in order to function adequately over wide temperature ranges, particularly when used in mining hard or dense ores and in particular highly abrasive ores, must not only have the properties of good wear on the wear surface but must also provide a strong total workpiece in order to survive the impact and strain which the workpiece endures during the normal mining procedures to which it is applied.

All of the methods hereinabove disclosed provide procedures which for their own particular uses may be adequate. However, to provide a metal workpiece suitable for use in extremes of temperature, pressure and high abrasion, the above noted procedures fall far short of providing tools suitable for use under these conditions.

DESCRIPTION OF THE INVENTION

The present invention relates to a method whereby a base metal member such as a forged or cast steel tool can be hardfaced by utilization of electroslag welding techniques to provide a finished product having improved resistance to abrasion and wear. Specifically, the present invention provides a method of hardfacing a metal workpiece with a metallic alloy containing hard carbide particles on the surface thereof which confers improved wear resistance properties as well as strength properties to the tool. In particular this invention relates to a procedure for providing hardfaced digging teeth suitable for use in bucketwheel excavators used in mining frozen tar sands. The tool provided by this invention has substantial strength properties and outstanding wear properties.

The method of the present invention provides a procedure whereby a granular matrix of hard metallic carbide particles are fused to the surface of a cast or forged metal workpiece by means of electroslag welding whereby the binding alloy is intimately associated with both the base metal workpiece and the hard carbide particles. The carbide particles are maintained on the surface of the electroslag weld veneer to provide a surface on the tool having substantially improved resistance to abrasion and wear.

In essence the present invention comprises utilizing electroslag welding methods to fuse particulate granules of metallic carbide onto the surface of a metal workpiece. It is particularly important that the metal carbide particles do not melt and dissolve within the weld pool during the fusing process. Should the metallic carbide particles melt, their effectiveness in providing wear resistance properties to the workpiece is substantially reduced. In procedures where the metal carbide particles are contained in or on the welding electrode, the particles normally melt and dissolve within the weld. However, by the method of the present invention, the metallic carbide particles are maintained in the particulate form through the manufacturing process and are bound to the outer surface of the weld to provide a bilaminar hard surface comprised of a weld matrix fused to the workpiece having particulate metal carbide particles on its outer surface. Thus by this procedure a unique hardfaced abrasion resistant tool is provided.

Referring now to the drawings, FIG. I is an illustration of electroslag welding apparatus suitable for use in the practice of the method of the present invention. Illustrated in FIG. I is workpiece 10 which can be hardfaced according to the present invention using plate 19 containing metallic carbide particles affixed thereto.

FIG. II provides a side view of a support plate of high melting hard metal having bound on the surface thereof granular particles on metal carbides. FIG. III is a drawing of the same plate as depicted in FIG. II from a frontal position. FIG. IV provides a variation of the plate shown in FIGS. II and III whereby the metallic carbide particles are encased in a metal enclosure. FIG. V provides a face view of the plate shown in FIG. IV. FIG. VI provides a drawing of a bucketwheel excavator tooth as shown in FIG. I provided with consumable guides disposed in the area of the tooth to be hardfaced by the electroslag welding method of the present invention. FIG. VIII is a view looking downward on the tooth of FIG. VI showing the consumable guide nozzles and the metallic carbide particle plate being arranged prior to being welded to the surface of the base metal tooth. FIG. VIII illustrates the side view of a base metal tooth having the bimetallic facing of high wear, steel matrix fused to the base tool and having metallic carbide particles imbedded in the face thereof. FIG. IX is the side view of the same tooth as shown in FIG. VIII.

Referring again to the drawings, FIG. I illustrates one embodiment of an electroslag welding apparatus 12 suitable for use in manufacturing hardfaced implements by the methods of the present invention. As an example, a forged steel excavator tooth 10 suitable for use in a bucketwheel excavator used for mining tar sands or the like is placed on workbench 11 in a position so that consumable guide nozzles 15 are located within an indentation provided at the area of the workpiece to be hardfaced. Immediately below the consumable nozzles in sump 16 which is a depression in bench 11 normally provided when electroslag welding procedures are employed. Consumable electrodes 13 are fed in the form of wire through consumable guide nozzles 15 into the space between the workpiece 10 and hardfacing plate 19 containing the metallic carbide particles. Electrode wire 13 can be fed from reels not shown. The electrode wire travels through straightening mechanism 20 and wire feeding mechanism 21 and passes through the interior of consumable feed nozzles 15. The consumable feed nozzles 15 are releasably connected on extension 14 of wire feeding mechanism 21. The consumable guides as is shown in FIG. I are located between the hardfacing plate 19 containing the metallic carbide particles and the hollow cavity or workpiece 10 formed when heat exchange shoe 17 is affixed in place adjacent to hardfacing plate 19 when that plate is in position across the front of the cavity of workpiece 10 as indicated by the arrow. Heat exchange shoe 17 has means for coolant inlet and outlet as shown as 18. Welding current is supplied from a conventional power supply 30 through cables 23 to lugs on extension 14 which hold the consumable guides 15, through the guides to the electrodes in the immediate vicinity of the weld, and then the flow of current returns through the base table 11 to the power supply through cable 22. The consumable guides 15 can be made to oscillate across the thickness of the cavity formed by member 10 and therefore distribute the heat evenly across the area being hardfaced.

The rate at which wire electrode 13 is fed into the weld is regulated by control apparatus 25 which has a connection to the wire feeding mechanism 21 by a cable 26. The control apparatus 25 is also provided with means to adjust the welding voltage remotely through cable 27, and to regulate through cable 28, the velocity at which the consumable guides 15 move across the thickness of the cavity of workpiece 10. The welding current is determined by the setting of the wire speed control. The wire feed mechanism 21 is powered by motor 29 in response to signals from unit 25 conducted through connection 26.

FIG. II provides a more detailed description of one type of hardfacing component 19 as is shown in FIG. I. The component shown has a backing plate 31 which can be a high melting nickel chrome steel. Other metal alloys which are compatible with the alloy provided by the weld pool created during the electroslag welding procedure wherein the electrodes 13 and consumable nozzles 15 melt to form the matrix alloy which fuses to the metal workpiece being hardfaced. The backing plate can also consist of metal silicates including common glass which has the mallic carbides 32 dispersed therein.

FIG. III shows a frontal view of hardfacing component 19 showing metallic carbide particles 32 affixed to the face of backing plate 31.

FIG. IV shows an alternative design and construction of hardfacing component 19 wherein a basic backing plate 31 having metallic carbide particles 32 affixed thereto has a frontal plate 33 of the same composition as backing plate 31. This variation provides that during electroslag welding procedure frontal plate 33 melts over the metallic carbide particles to further provide a fused matrix to hold metallic carbide particles 32 in place on the front of base metal workpiece 10.

FIG. V is a frontal view of the hardfacing plate shown in FIG. IV.

FIG. VI provides a view of a base metal workpiece such as a bucketwheel excavator tooth in which consumable nozzles 15 are in place in the cavity provided for hardfacing on workpiece 10. Also shown are consumable electrode wires 13 passing through consumable guide nozzles 15. A cutaway of hardfacing plate 19 is shown in FIG. V having the metallic carbide particles in the hardfacing component cavity and in place in accordance with the method of the present invention for electroslag welding.

FIG. VII provides a view looking downward on the base metal workpiece 10 showing the consumable guide nozzles 15 in place in the hardfacing cavity of workpiece 10 and also the hardfacing plate 19 having the metallic carbide particles 32 on the surface thereof as well as heat exchange means 17 which can be a copper shoe having inlet and outlet coolant recepticles 18 therein. FIG. VIII illustrates a side view of the finished hardface workpiece shown as a bucketwheel excavator tooth having the metallic carbide particles fused in a matrix of metal alloy onto the surface of the metal workpiece.

FIG. IX shows a view looking downward on the bucket wheel excavator tooth showing the metallic carbide particles fused into the matrix provided by the electroslag welding procedure which is therein fused to the surface of the workpiece that has been hardfaced thereby providing a bimetallic laminated hardfaced tool.

The method of the present invention as herein disclosed provides a novel method to manufacture a novel metal workpiece having a hardfacing suitable for use with highly abrasive materials. The product of the method of the present invention essentially comprises a basic metal tool having on the work surface a hardfacing comprising a matrix of abrasion resistant metal alloy containing highly abrasive resistant particles of metallic carbide. The base metal tool to be hardfaced can be cast or forged metal preferably of a steel alloy of the type normally used in toolmaking for application where high tensile strength and high abrasive resistant characteristics are required. These types of metal alloys are well known to those skilled in the art and include ferrous and nonferrous metals or alloys such as chrome steel, manganese steel, chrome nickel steel and monel metal. The alloys can contain such components as ferrochrome, ferrosilicone, ferromanganese, ferrovanadium, ferromolybdenum, powder nickel and other components as required by the particular physical characteristics desired in the hardfacing matrix.

The metallic carbide particles dispersed over the surface of the matrix and fused therewith and forming the outer surface layer of the bilaminar hardfaced tool can include the refractory carbide particles such as tungsten carbide, silicon carbide, chromium carbide, titanium carbide and other similar carbides. This type of particulate surfacing material is adherent to a wide variety of base metals such as various steels including alloys such as those disclosed in the paragraph above.

In the preferred embodiment of the method of the present invention, automatic electroslag welding equipment is employed. Standard electroslag welding techniques normally practiced in the art and using an electrode wire of any type from which molten metal is produced under the shielding of a granular flux are applicable. A filler steel wire of metallic alloys desired in part or in whole to provide the hardfacing matrix on the work face of the tool being hardfaced is also used. The filler electrode wire and/or the guide consumable nozzles can be composed of or contain the oxidizing agents such as ferromanganese and ferrosilicone or denitrifying agents such as ferrozircon or slag producing materials for facilitating welding operations and for adjusting basicity of the slag in the weld pool as well as for providing the essential metals from the desired alloys. Metals such as nickel chromium, molydenum, titanium, zirconium and others are included.

Again referring to the drawing in FIG. I, a metal workpiece such as a forged steel tooth 10 designed for use on a bucketwheel excavator and having an indentation on its face is first preheated to a temperature in the range of 500°-1000° F. and more preferably 600°-700° F. and placed in the proper relation to consumable nozzles 15 which are comprised of a compacted alloy of particles of ferrochrome, tungstem carbide, ferromolybdenum and ferrovanadium. In this particular example, the consumable nozzles were prepared by blending together 49.97 percent ferrochrome by weight, 49.97 percent tungsten carbide by weight, 0.03 percent ferromolybdenum by weight and 0.03 percent ferrovanadium. The particle sizes of each metal component were less than 120 mesh. The metallic particles were blended together in a sodium silicate liquid carrier, compressed, shaped and heated until fused into a solid form as shown. The hardfacing plate 19 contains a nickel chrome steel containing by weight 2.0 percent nickel, 2.0 percent chrome, 0.5 percent molybdenum and the remainder 30 carbon steel. The hardfacing plate has on the face thereof particles of tungsten carbide having sizes in the range of 10 to 325 mesh. The plate 19 is placed over the face of the indenture on the work face of workpiece 10 as shown in FIG. I. Thereafter heat exchange shoe 17 is affixed next to the face of the tungsten carbide plate 19 and in communication with workpiece 10 and the cavity formed therefrom between the cooling shoe and the workpiece provides the walls in which the electroslag weld pool is formed. About 1/10 of a pound of metal powder of the same alloy as that in electrodes 13 is placed in sump 16 in FIG. I. Electroslag welding is initiated by setting the electrodes at 44 volts and 400 amps wherein an arc is initiated between the electrode and the powdered metal in the sump and thereafter ⅛ of a pound of electrode slag flux is added and the electrode slag welding procedure begun. Electrode wires are fed at a rate to provide that the entire cavity is filled over a period of 5.5 minutes. The amperage of the electrodes is programmed so that during the 5.5 minute period of welding the amperage continually increases in a linear manner until it reaches 1000 amperes at the end of the 5.5 minutes. The voltage is programmed to decrease over the same period of time until it reaches 32 volts at the end of 5.5 minutes. A heat exchange rate is maintained in the heat exchange shoe 17 so as to maintain a temperature about the surface of the electroslag pool adjacent to the heat exchange shoe 17 in a temperature range sufficient to maintain the tungsten carbide particles in solid from. By this procedure a substantial part of the metallic carbide particles are prohibited from dissolving in the molten weld pool thereby providing the workpiece with a surface of abrasion resistant metallic carbide particles fused in a matrix of a hard metallic alloy which is in turn fused to surface of the workpiece.

Referring again to FIGS II through V inclusive, backing plates 31 as well as frontal plate 32 can be of a metal alloy or of other solid compositions which melt and are compatible with the alloy of the hardfacing being applied. Preparation of facing plate 19 can comprise binding to the surface of the plate metallic carbide particles using any of the well known adhesives suitable for binding metals. A preferred binder is sodium silicate nor ally in the form of 60 percent sodium silicate in water. A hardfacing plate 19 can be prepared by first blending the metallic carbide particles in a sufficient quantity of sodium silicate to wet the surfaces of all the particles. Thereafter the blend of sodium silicate and metallic carbide particles are spread over the surface of the backing plate 31 and thereafter heated until water is removed from the sodium silicate solution and the particles are bound to the surface of the backing plate. Another example of preparing hardfacing plate 19 is to blend metallic carbide particles into molten glass thereafter spreading the glass to a thin sheet and letting cool to a hardfacing plate conprised of glass having metallic carbide particles dispersed therein. Metals may also be used to fuse the metallic carbide particles to the surface of a backing plate. The basic requirement in preparing hardfacing plate 19 for use in the methods and compositions of the present invention is to provide a desired thickness of metallic carbide particles dispersed by a rigid backing medium which melts at the temperatures below 3000° F. and either forms a part of the metal alloy in the weld or rises to the surface of the weld in the slag pool and is thereafter discarded.

Backing plate 19 is preferably equivalent in size to the area of the workpiece being hardfaced. However, it can be designed such that only a part of the work surface of the workpiece is provided with the metallic carbide particles.

The invention claimed is:

1. A method for hardfacing a metal workpiece to provide said workpiece with a work surface consisting of a metal hardfacing composition containing metallic carbide particles fused to the outer surface thereof comprising the steps of:
a. forming a gap between the work surface to be hardfaced and a metal plate containing metallic carbide particles adhered thereto;
b. placing at least one consumable guide nozzle having a means for passing an electrode wire therethrough in said gap and
c. passing an electrical current through said electrode wire to thereby melt said consumable nozzle, electrode wire and said plate while supporting said carbide particles at said gap to thereby fuse said metallic carbide particles to said work surface to provide a hardfacing on said work surface having metallic carbide particles on the outer surface thereof.

2. A method according to claim 1 wherein the workpiece is hardfaced while at a temperature in the range of 500° to 1000° F.

3. A method according to claim 1 wherein the metallic carbide is tungsten carbide.

4. A method according to claim 3 wherein the workpiece is hardfaced while at a temperature in the range of 500° to 1000° F.

5. A method according to claim 3 wherein said workpiece is a bucketwheel excavator tooth.

6. A method according to claim 5 wherein the workpiece is hardfaced while at a temperature in the range of 500° to 1000° F.

7. A method according to claim 1 wherein said workpiece is a bucketwheel excavator tooth.

8. A method according to claim 7 wherein the workpiece is hardfaced while at a temperature in the range of 500° to 1000° F.

* * * * *